J. F. S. SMITH.
Cake-Cutting Machine.
No. 209,365. Patented Oct. 29, 1878.
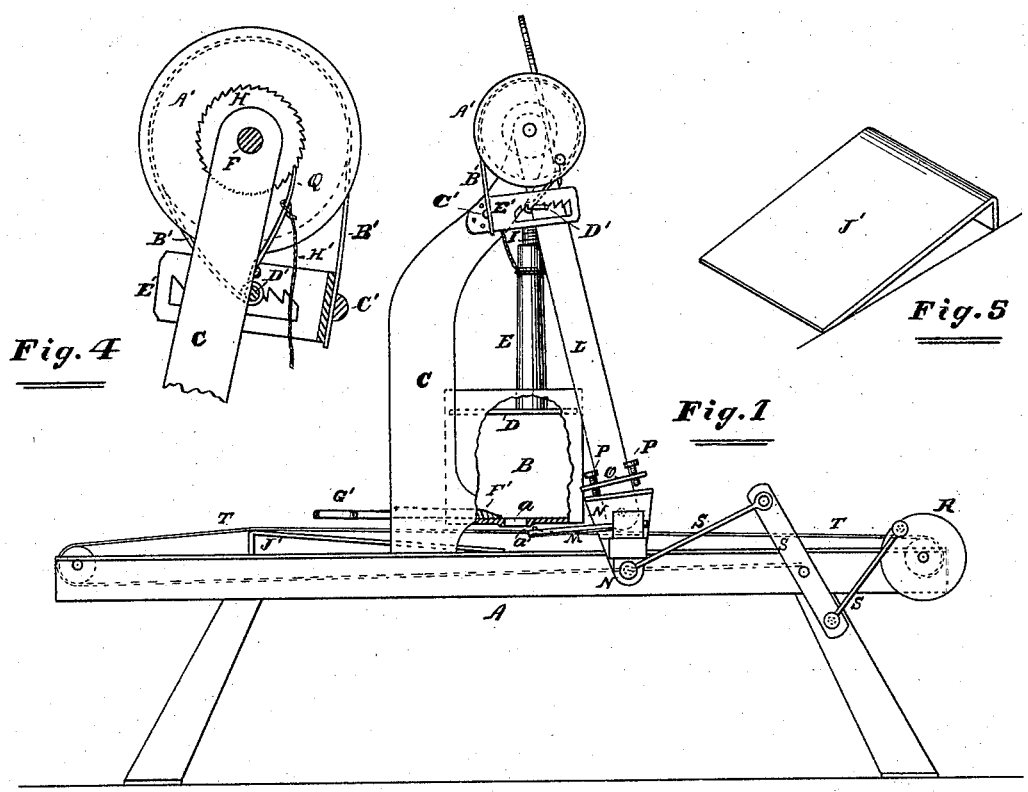
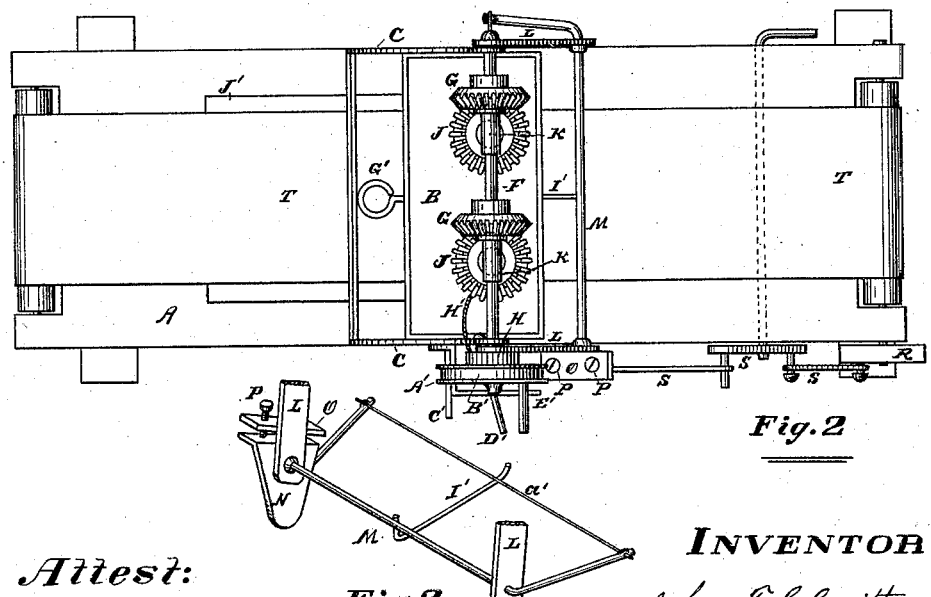
Attest:
Charles H. Schoff
L. S. Schoff
INVENTOR:
John F. S. Smith,
By Coyne & Co his
Attorneys.

UNITED STATES PATENT OFFICE.

JOHN F. S. SMITH, OF CHICAGO, ILLINOIS, ASSIGNOR TO DAVID F. BRUNNER, OF SAME PLACE.

IMPROVEMENT IN CAKE-CUTTING MACHINES.

Specification forming part of Letters Patent No. 209,365, dated October 29, 1878; application filed August 17, 1878.

*To all whom it may concern:*

Be it known that I, JOHN F. S. SMITH, of Chicago, in the county of Cook and State of Illinois, have invented certain new and useful Improvements in Machines for Cutting Cakes, Ginger-Snaps, &c., of which improvements the following, in connection with the accompanying drawings, is a full, clear, and exact description.

In the drawings, Figure 1 is a side elevation of a machine embodying my improvements; Fig. 2, a top or plan view thereof; Fig. 3, a perspective of the vibrating cutter; Fig. 4, a side elevation of the friction device, enlarged; and Fig. 5, a perspective of the movable inclined plane.

Like letters of reference indicate like parts.

My invention relates to that class of machines intended for the purpose of cutting from masses of dough small quantities thereof, in the form of cakes, ginger-snaps, &c., which are thus made ready for baking.

My object is to improve the construction and operation of such machines in the several respects hereinafter set forth; and to that end my invention consists in the means, substantially as hereinafter specified, which I employ for the purpose of accomplishing the results desired.

Heretofore the mass of dough to be cut has been placed in a box or receiver, having in its bottom holes or openings corresponding in form to the form of the cakes, the dough being pressed down slowly through the openings referred to by means of a presser, and the ejected portion being cut through horizontally by means of a vibrating cutter hung on a vibrating frame, and both actuated by means of connecting arms or pitmen connected to a drive-wheel. When the dough is thin so little resistance is offered to the cutter that the vibration of the latter is frequently insufficient to cause it to perform its functions properly. The object of this part of my invention is to render the action of the cutter certain at all times, and this I accomplish by increasing the resistance offered to the forward movement of the vibrating arms or frame which carries the cutter, as will hereinafter more fully appear.

In the drawings, A represents a table, above the central part of which is supported a box or dough-receiver, B, having holes or openings in its bottoms, as shown at *a*. The box B may be supported a suitable height above the table by being attached to standards C C.

D is a presser in the box B, and E E are tubular posts on the presser, and these posts are screw-threaded internally. F is a shaft journaled in the upper ends of the standards C C. G G are beveled gears on the shaft F, and H is a ratchet-wheel, also on the said shaft, the gears and ratchet being rigid thereon. I I are screws entering the posts E E, and J J are beveled gears, rigidly mounted on the said screws, and engaging the gears G G. The upper ends of the screws I I, which are plain or smooth, turn in sleeve-sockets K K on the shaft F.

L L are vibrating arms, suspended freely on the shaft F; and M is a cutter, turning freely in the lower ends of the arms L L. N is a rigid arm or plate depending from the cutter, and also extending somewhat above it; and O is a horizontal plate or leaf, rigidly connected to one of the arms L L, and arranged above the upper edge or end of the arm or plate N, which may be there bent out parallelly with the plate O. P P are screws entering the plate O, and arranged to be struck by the upper end of the arm or plate N during the vibration of the cutter, and the extent of its vibration in its bearings may be regulated by means of the screws P P. Q is a pawl pivoted to one of the arms L L, and arranged to engage and rotate the ratchet H during the forward movement of the said arm. R is a drive-wheel, and S S are pitmen or connecting arms, connecting the lower end of the arm or plate N to the drive-wheel. The vibration of the cutter M is much less than that of the arms L L, and while the latter move or swing forward or backward the forward end of the cutter moves up or down.

The operation of the machine now described is as follows: The rotation of the wheel R, connected, as shown, to the lower end of the arm or plate N, causes the forward part of the cutter M to rise to the extent of its upward vibration when the thrust of the connecting arms or pitmen is forward, and when the up vibration of the cutter ceases the arms L L are carried forward, and carry the cutter with them.

That part of the cutter which performs the function of severing the dough thrust through the holes *a a* consists of a fine or slender wire, *a'*, which, by the movement already described, is carried up against the bottom of the box B, and then pushed forward through the dough ejected, thus severing it from the mass in the box. During this forward movement of the arms L L the pawl Q, by engaging the ratchet H, has caused the rotation of the shaft F, and the engagement of the gears G and J, by causing the screws I I to be rotated in the posts E E, causes the descent of the presser D, and a proper amount of dough is thus forced out through the holes *a a* in time to be acted upon by the cutter.

All the parts return to their original position on the back-stroke of the driving-arm or pitman, excepting, of course, the presser D and its gearing. The severed dough falls in cakes upon an endless apron, T, which may be fed forward in any suitable manner.

I make no special claim to any of the parts of the machine now described, but have described their construction and operation with some particularity in order that the nature of my improvements may be clearly understood.

The reason the wire *a'* is not raised with certainty when the dough is thin is that the arms L L tend to swing forward automatically, owing to the manner in which they are hung with respect to the box B; hence, the dough not being stiff enough to resist this movement, the driving pitman on arm exerts no force upon the wrist-pin or the arm or plate N, and the cutter, therefore, is not turned in its bearings.

To overcome the tendency of the arms L L to swing forward automatically, I employ the means which I will now describe.

A' is a wheel or pulley rigidly attached to one end of the shaft F, and B' is a strap passing over the said wheel. One end of the strap B' is attached to the fixed pin C', and the other to a loose or movable pin, D'. E' is a serrated arm or plate, and the outer end of the pin D' is arranged to be engaged by the serrations, as shown. By moving the outer end of the pin D' back and forth in the serrations, the friction of the strap B' upon the wheel A' may be either increased or diminished, as may be desired, and this friction may thus be made sufficient, with facility, to insure the up movement of the wire *a'*, however thin the dough may be, it being understood that the automatic forward movement of the arms L L is thus prevented, inasmuch as the shaft F cannot be turned as easily as before; also, when the dough is very thin, it is liable to run out through the holes *a a* before the box B is filled. To prevent the escape of the dough in this manner, I employ a slide, F', arranged in the bottom of the box B, and adapted to cover the openings *a a*.

G' is a handle connected to the slide F', and by means of which the latter may be moved.

Another defect of these machines is that the presser D is sometimes allowed to continue its descent through inadvertence after the dough has all been expelled from the box B, thus resulting in injury to the machine. To stop the descent of the presser with certainty and automatically at the proper time, I connect the pawl Q to the descending parts by means of a cord or chain, H', of such a length that the pawl will be thereby disengaged from its ratchet when the dough is exhausted.

The cutting-wire *a'*, if allowed to vibrate too much while leaving the dough, is likely either to scatter the severed parts or destroy their proper form. I' is an arm freely supporting the central part of the wire *a'*, and bent upward slightly on its outer end, as shown. The arm I', while permitting some vibration of the wire *a'*, prevents too much. So, also, the severed parts of the dough, if they are allowed to fall too far before reaching the apron T, are liable to strike upon their edges, and thus become crimped or curled up. To prevent this result, I employ a movable inclined plane, J', arranged underneath the apron T, as shown. By moving this inclined plane to or from the box B, the apron, or that portion thereof immediately below the box, may be either raised or lowered with facility, as may be desirable or necessary.

Having thus described my invention, what I claim as new, and desire to secure by Letters Patent, is—

1. The combination, in a machine for cutting dough, of the vibrating arms or frame L L, carrying the cutter, with a friction device for retarding the vibration of the said arms, substantially as and for the purposes specified.

2. The combination, in a machine for cutting dough, of the wheel or pulley A', the friction-strap B', and the vibrating arms L L, substantially as and for the purposes specified.

3. The combination, in a machine for cutting dough, of the cutting-wire *a'* and the guard or arm I', freely supporting the said wire and slightly bent upward at its outer end, substantially as and for the purposes specified.

JOHN F. S. SMITH.

Witnesses:
F. F. WARNER,
S. E. CARPENTER.